US010779155B2

United States Patent
Sen et al.

(10) Patent No.: US 10,779,155 B2
(45) Date of Patent: Sep. 15, 2020

(54) CUSTOMIZABLE AND LOW-LATENCY ARCHITECTURE FOR CELLULAR CORE NETWORKS

(71) Applicants: AT&T Intellectual Property I, L.P., Atlanta, GA (US); The Regents Of The University Of Michigan, Ann Arbor, MI (US)

(72) Inventors: Subhabrata Sen, Westfield, NJ (US); Oliver Spatscheck, Randolph, NJ (US); Mehrdad Moradi, Ann Arbor, MI (US); Zhuoqing Morley Mao, Ann Arbor, MI (US)

(73) Assignees: AT&T Intellectual Property I, L.P., Atlanta, GA (US); The Regents Of The University of Michigan, Ann Arbor, MI (US)

( * ) Notice: Subject to any disclaimer, the term of this patent is extended or adjusted under 35 U.S.C. 154(b) by 0 days.

(21) Appl. No.: 16/037,450

(22) Filed: Jul. 17, 2018

(65) Prior Publication Data

US 2020/0029199 A1    Jan. 23, 2020

(51) Int. Cl.
*H04W 8/02* (2009.01)
*H04L 29/08* (2006.01)

(52) U.S. Cl.
CPC .......... *H04W 8/02* (2013.01); *H04L 67/2809* (2013.01); *H04L 67/303* (2013.01)

(58) Field of Classification Search
None
See application file for complete search history.

(56) References Cited

U.S. PATENT DOCUMENTS

| | | | |
|---|---|---|---|
| 9,819,576 B2 | 11/2017 | Sella et al. | |
| 9,906,382 B2 | 2/2018 | Huang | |
| 9,949,133 B2 | 4/2018 | Ashrafi | |
| 10,206,094 B1* | 2/2019 | Wen | H04W 8/082 |
| 2014/0259012 A1* | 9/2014 | Nandlall | H04W 8/02 718/1 |
| 2017/0086111 A1* | 3/2017 | Vrzic | H04W 36/023 |
| 2017/0086191 A1 | 3/2017 | Sipra et al. | |
| 2017/0104847 A1 | 4/2017 | Zhang et al. | |
| 2017/0126618 A1 | 5/2017 | Bhaskaran et al. | |
| 2017/0289270 A1 | 10/2017 | Li et al. | |
| 2017/0303259 A1 | 10/2017 | Lee et al. | |
| 2018/0018195 A1 | 1/2018 | Kim et al. | |
| 2018/0098246 A1 | 4/2018 | Hoffmann | |
| 2018/0109590 A1* | 4/2018 | Rao | H04W 40/20 |
| 2018/0115470 A1 | 4/2018 | Huang et al. | |
| 2018/0123961 A1 | 5/2018 | Farmanbar et al. | |
| 2018/0199398 A1* | 7/2018 | Dao | H04W 36/14 |
| 2018/0302824 A1* | 10/2018 | Christopherson | H04W 76/10 |

(Continued)

OTHER PUBLICATIONS

Bonfim et al.; "Integrated NFV/SDN Architecture: A Systematic Literature Review"; ACM Computing Surveys; 2018; 52 pages.

(Continued)

*Primary Examiner* — Lonnie V Sweet
(74) *Attorney, Agent, or Firm* — BakerHostetler

(57) ABSTRACT

Systems and methods provide containers instantiated for each user equipment (UE), or on "per-UE" bases, which consolidate certain network functions for processing UE traffic into an efficient, in-network, and proximate virtualization to reduce latency and increase customizability.

19 Claims, 11 Drawing Sheets

(56) References Cited

U.S. PATENT DOCUMENTS

2019/0045000 A1* 2/2019 Hiremath .............. H04L 49/501
2019/0166493 A1* 5/2019 You ................... H04W 12/0401
2019/0190967 A1* 6/2019 Kollar .................... H04W 4/18

OTHER PUBLICATIONS

Ford et al.; "Achieving Ultra-Low Latency in 5G Millimeter Wave Cellular Networks"; IEEE Communications Magazine; 2017; 6 pages.

* cited by examiner

CUSTOMIZABLE AND LOW-LATENCY ARCHITECTURE FOR CELLULAR CORE NETWORKS

TECHNICAL FIELD

This disclosure relates generally to network management and, more specifically, to instantiating, migrating, utilizing, and destroying containers created on a per-User Equipment (UE) basis.

BACKGROUND

Current cellular networks, such as 4G/LTE networks, include radio access network (RAN) and evolved packet core network (EPC) frameworks. These architectures may lack high-resolution customizability and programmability in control and data planes, utilize complex nodes and protocols which increase control plane traffic (e.g., "signaling storms"), and enforce most network policies at central gateways resulting in inflated paths for certain traffic.

More generally, cellular core networks are stateful systems with certain rules. Three roles of cellular core networks include (1) connecting UE to networks, (2) handling UE mobility in connected and idle modes, and (3) enforcing network policies. The Third Generation Partnership Project (3GPP) EPC framework has a hierarchical and centralized structure and partitions these roles among a few dedicated gateway nodes.

The limitations imposed by current frameworks will limit future mobility capability. However, virtualization allows for architectures that are more flexible and coordinated leveraging of geographically disparate resources to support networks. Future mobility capability can be expanded, compatibly with these frameworks, through invention leveraging these emerging technologies.

SUMMARY

In an aspect, a system comprises a container module configured to instantiate a per-user equipment (per-UE) container representing a user equipment device (UE) associated with a network. The per-UE container is configured to be instantiated during association of the UE with the network based on a fetched UE profile using a container module. The per-UE container includes a mobility module configured to manage mobility of the UE in the network. The per-UE container also includes a policy module configured to manage data plane policies associated with the UE.

In another aspect, a method comprises detecting user equipment (UE) entering a network and instantiating, using a container module and based on a fetched UE profile associated with the UE, a per-user equipment (per-UE) container representing the UE. The per-UE container comprising a mobility module configured to manage mobility of the UE in the network and a policy module configured to manage data plane policies associated with the UE.

According to yet another aspect, at least one non-transitory computer readable medium stores instruction. The instructions, when executed by a processor, perform aspects to instantiate a container representing a user equipment device (UE) associated with a network. The container comprises a mobility module configured to manage mobility of the UE in the network and a policy module configured to manage data plane policies associated with the UE.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
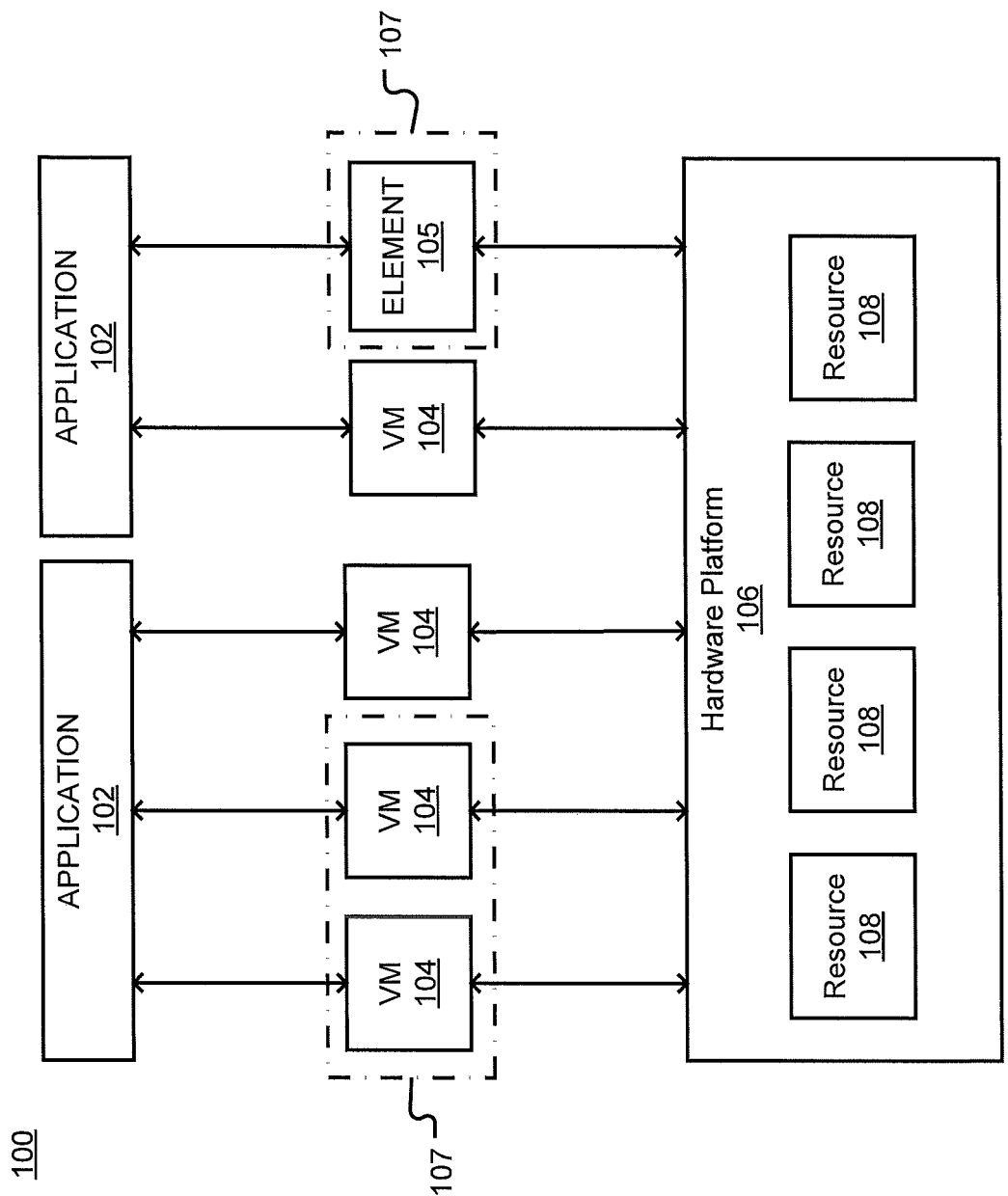
FIG. 1A is a representation of an example network.

As noted above, evolving network architecture and virtualization enabled thereby provides greater flexibility than earlier systems. Unconventional solutions for scalable and customizable network architectures disclosed herein leverage those evolving standards and frameworks. In particular, customized and low-latency services are provided on a per-UE basis at large scale. This is achieved through network function virtualization (NFV) and software-defined networking (SDN). Aspects herein consolidate many network functions (NFs) needed for processing each UE's traffic into a lightweight, in-network, per-UE agent or container in its proximity (e.g., physically and logically nearby).

The benefits of this per-UE agent or container are apparent in view of the drawbacks of conventional and well-understood network architectures. As discussed above, substantial network functionality is concentrated at certain gateways or nodes. For example, at the Internet edge, the packet data network gateway (PGW) connects the core to Internet/content providers and enforces certain network policies (e.g., network address translation, filtering). At the radio edge, enhanced node Bs (eNodeBs or eNBs) are grouped into serving areas then connected to serving gateways (SGWs). Each SGW acts as a local mobility anchor point for its eNBs. It also forwards data traffic between the eNBs and PGW using General Packet Radio Service (GPRS) tunneling protocols (e.g., GTP-U/C). To connect to the network, switched-off UEs must register with the mobility management entity (MME) through eNBs. The MME continuously exchanges signaling (control) traffic with UEs and eNBs to perform security functions (e.g., authentication) and provide mobility support. MMEs access a home subscriber server (HSS), a centralized database containing UE-related information (e.g., SIM card key), in furtherance of these functions. For connected UEs, a policy and charging rule function (PCRF) describes how UE traffic is handled through interaction with a subscriber profile repository (SPR). The SPR can track UE plans and supply Quality of Service (QoS) rules to PGWs and SGWs in real-time.

This configuration, which often requires routing traffic to "touch" a gateway before it is delivered to its destination, can cause lengthy traffic paths (e.g., for UE-to-UE traffic, or for UE-to-Internet traffic) which are "inflated" in comparison to more direct paths that could be utilized but for gateway involvement. Longer paths result in longer end-to-end latencies that can adversely impact application performance and user experience. Longer paths also ultimately result in the traffic transiting more portions of the network, at times twice where a return path is similar to an earlier path, which can increase network capacity requirements.

Routine or conventional network architecture cannot overcome these drawbacks. Except for some minimal flexibility at PCRF in defining data plans, EPC nodes are not programmable. EPC nodes run the same control NFs (e.g., handover at MME) and data NFs (e.g., filtering at PGW) for multiple UEs. Further, EPC consists of complex nodes and protocols (e.g., Diameter, GTP-C) which can generate signaling storms during execution of even relatively simple functions (e.g., online charging). Finally, EPC enforces many policies centrally at PGW, causing relative path inflation and performance degradation in comparison to what could be achieved with a flatter architecture, particularly for traffic between physically and/or logically nearby nodes. For example, UE connecting to a website located in the same city may need to go to a PGW mode in another city for Internet access only to be routed to the local website. Similarly, for a communication between two UEs connecting the same cell tower, the traffic would be routed from the sender UE "up" to the PGW serving the geographic region before being sent "down" to the receiver UE.

Virtual EPC (vEPC) solutions do not provide solutions in this and other regards. For example, they inherit the EPC's lack of customizability and risk of signaling storms as they offer no or minimal change to the EPC functionality, nodes, interfaces, and protocols. vEPC also introduces new performance bottlenecks as the EPC when run in software.

These and other alternatives also face traditional design limitations of SDN architectures. For example, to realize flow-level policy enforcement, some "clean-slate" SDN architecture proposals seek to establish a cellular core with a network design similar to a datacenter. Such proposals centralize the EPC control plane (e.g., MME, PCRF, HSS) in applications on a central controller and instruct eNBs to forward UE signaling traffic to the controller. Such proposals also disaggregate the EPC data plane (e.g., in SGW, PGW) into single-purpose middleboxes or NFs (e.g., DPI, buffer, transcoder), distribute them around the network, and interconnect them through a programmable switching fabric. The controller programs switches to tunnel UEs' data traffic through NF chains to enforce network policies. In embodiments, the programmable switching fabric is comprised exclusively of virtual switches. In alternative embodiments, the switches can include virtual and hardware switches. Virtual switches may reside in or be run by per-UE containers 140, or reside in other locations or be run by other elements. However, this datacenter-type design approach suffers from weaknesses similar to those of EPC networks descried above: it mixes network policies for different UEs together and scatters them into geo-distributed devices. This results in path inflation and propagation delays, increased input/output (I/O) costs (e.g., system calls and interrupts due to processing UE data traffic by multiple network interface controllers (NICs) which can diminish forwarding rate), centralized processing of UE signaling traffic, and the inability to efficiently perform per-UE customization. More, highly distributing the controller introduces substantial "east-west" control (signaling or intra-datacenter) overheads, and chaining distributed network functions requires complex tunneling protocols that increase forwarding states in SDN switches, making per-UE data plane customization inefficient and expensive.

The unconventional solution of this disclosure uses a novel cellular core architecture combining network function virtualization (NFV) and SDN to address the above challenges and achieve much greater flexibility, performance, and scalability using ultra-low latency services on a per-UE basis. Rather than partitioning network policies associated with UE in distributed devices, as performed by, e.g., vEPC, the disclosed architecture consolidates policies into a single process in proximity to the UE. The container establishes a virtualized, vertical slice of control and data NFs for each UE, with UE signaling and data traffic steered through the container for policy enforcement. The hierarchical EPC architecture dependent on a few gateways is replaced with a highly distributed, flatter, and simpler architecture where per-UE agents or containers close to the radio network edge are responsible for enforcing a wide range of policies, obviating the need for inflated traffic paths to a core network.

While certain architectures are depicted herein to fully describe networks and environments in which aspects of the disclosure operate, it is understood that certain embodiments will require modification of those networks or environments as disclosed herein to achieve the benefits of the invention(s), even where such modification is not expressly provided in the drawings or description.

Turning to the drawings, FIG. 1A is a representation of an example network 100. Network 100 may include one or more applications (which in turn may include one or more VNFs) implemented on general-purpose hardware, such as in lieu of having dedicated hardware for every network function. That is, general-purpose hardware of network 100 may be configured to run applications. In embodiments, general purpose hardware may be combined with special purpose hardware, within hardware platform 106, embodied as element 105, or distributed elsewhere within a network to which elements of FIG. 1A are communicatively coupled, to achieve particular functionality.

Each application 102 may use one or more VMs 104 or elements 105 to operate. Each VM 104 may have a VM type that indicates its functionality or role. Examples of VMs 104 include gateways (GWs), firewalls (FW), routers, real-time analytics, customer edges (vCEs), provider edges (vPEs), proxies, rendezvous points (RPs) or the like. Similarly, each element 105 may have an element type that indicates is functionality or role. Examples of elements 105 include an ingress point, an egress point, a non-virtualized function, or the like. While specific reference may be made to VMs 104 or groups (which may include one or more elements 105), this is for explanation to show that the deployment plan may not necessarily limited to virtual components in all implementations. As noted earlier, while VMs are discussed for ease and consistency of explanation, this focus may be substituted by or supplemented with focus on containers. For example, one or more of VMs 104 or elements 105 can be a container. Similarly, various clients can be substituted for or comprise application 102, including but not limited to databases, webservers, media transcoders, other cloud applications, et cetera.

Each VM 104 may consume various network resources from a hardware platform 106, such as resources 108. For example, resources 108 may include one or more virtual central processing units (vCPUs), memory, or a network interface cards (NIC). Resources 108 can be dedicated or commingled in support of one or more VM 104, with such utilization or assignment being performed dynamically, and need not conform to any particular arrangement (e.g., multiple CPUs can support one VM, multiple VMs can be supported by one CPU, et cetera). Various rules can be used in such allocation.

Figure 1B:
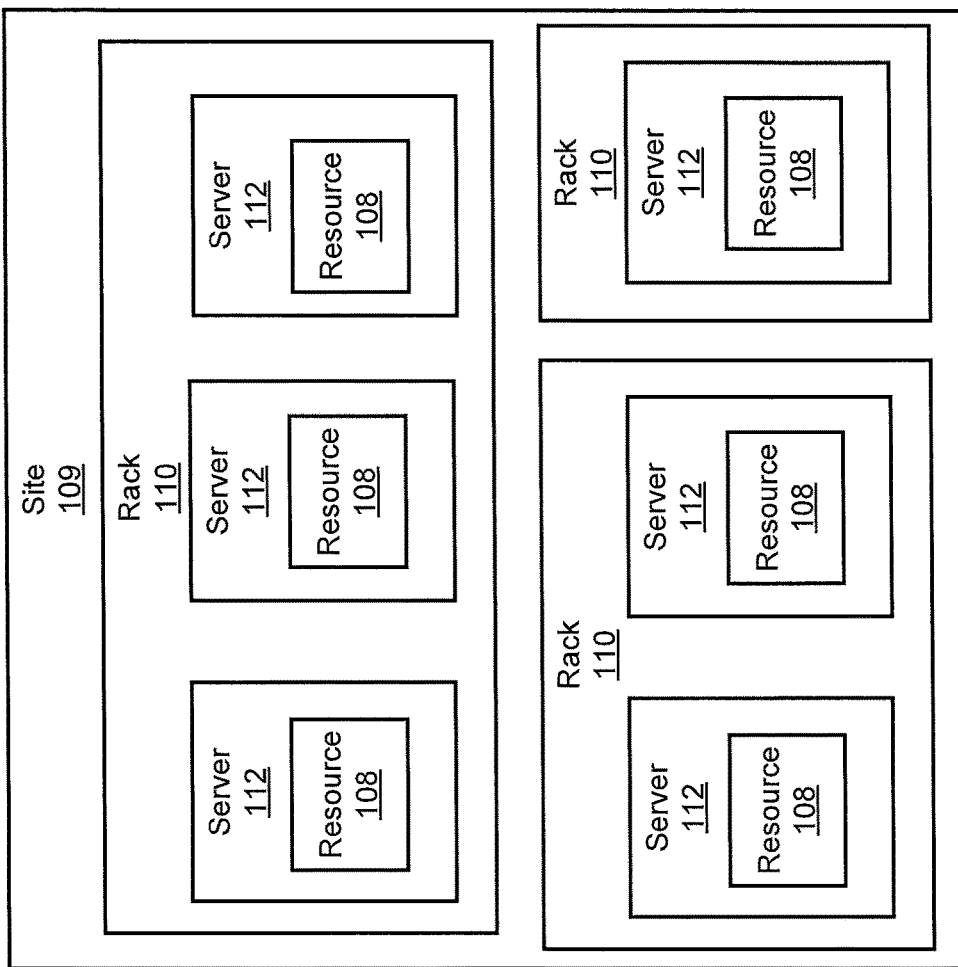
FIG. 1B is a representation of an example hardware platform for a network.
Figure 1B:
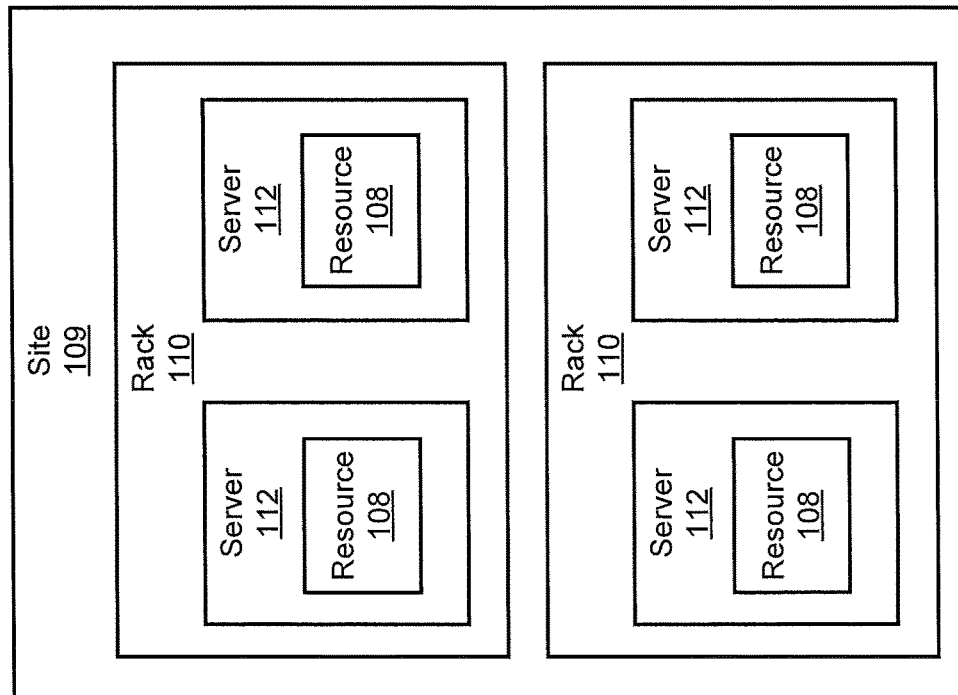

While FIG. 1A illustrates resources 108 as collectively contained in hardware platform 106, the configuration of hardware platform 106 may be further delineated. FIG. 1B provides an example implementation of hardware platform 106.

Hardware platform 106 may comprise one or more sites 109. For example, a site 109 may be a room, building, or geographic location in which resources 108 are located. For example, site 109 may be a datacenter. Each site 109 may comprise one or more racks 110. In an aspect, rack 110 may refer to the physical housing or platform for multiple servers or other network equipment. In an aspect, rack 110 may also refer to the underlying network equipment. Each rack 110 may include one or more servers 112. Server 112 may comprise general-purpose computer hardware or a computer. In an aspect, rack 110 may comprise a metal rack, and servers 112 of rack 110 may comprise blade servers that are physically mounted in or on rack 110.

Each server 112 may include one or more network resources 108, as illustrated. Servers 112 may be communicatively coupled in any combination or arrangement. For example, all servers 112 within a given site 109 or rack 110 may be communicatively coupled. As another example, servers 112 in different racks 110 may be communicatively coupled. Additionally or alternatively, racks 110 may be communicatively coupled in any combination or arrangement.

The characteristics of each site 109, rack 110, and server 112 may differ. For example, the number of racks 110 within two sites 109 may vary, or the number of servers 112 within two racks 110 may vary. Additionally or alternatively, the type or number of resources 108 within each server 112 may vary. In an aspect, rack 110 may be used to group servers 112 with the same resource characteristics. In another aspect, servers 112 within the same rack 110 may have different resource characteristics.

A single application 102 may include many functional components (e.g., VMs 104 and elements 105. These components may have dependencies upon each other and inter-communication patterns with certain quality of service (QoS) requirements, such as locality, high availability, and security. Consequently, placement decisions that is, decisions on how (and where) to implement VMs 104 and other elements 105 within hardware platform 106—may be based on all VMs 104 in which the components of application 102 run, including the dependencies of those VMs 104, holistically.

Such QoS requirements may be domain or application specific. Thus, a deployment plan for assigning resources 108 to VMs 104 of an application may depend upon certain limitations and requirements of both network 100 and application 102, such as the QoS requirements of a given application 102 and the underlying infrastructure of network 100. As all of this information is not typically accessible to both the application provider (that may not have access to network infrastructure details) and the cloud provider (that may not have access to the functionality of application 102), an abstraction may be used to create a deployment plan for application 102. Creation of the deployment plan can occur without knowledge or consideration of the specific infrastructure information.

A deployment plan may assign VMs 104 to particular resources 108 in accordance with one or more rules in order to account for the requirements of application 102 supported by such VMs 104. These rules may be based on abstracting the requirements of application 102, such as by levering the application provider's knowledge on its application 102 to yield a concise and flexible representation of the locality, availability, and security requirements of application 102 without needing to capture the specifics of the cloud infrastructure underlying network 100. The deployment plan may be based on one or more affinity rules, diversity (or anti-affinity) rules, exclusivity rules, or pipe rules. The deployment plan may further be based on nesting groupings (e.g., rules or sets of VMs 104). For example, the abstraction may provide for certain VMs 104 to be grouped together, so that rules may be applied to groups of VMs 104 or to individual VMs 104. A group may include one or more VMs 104, or other elements 105, such as ingress points, or the like. For example, FIG. 1A shows two example groups 107.

FIGS. 1A and 1B provide an environment for systems described herein, which can be include host systems, guest systems, or orchestration systems. In an example, VNFs implemented on such environments can include a virtual Mobility Management Entity (vMME), a virtual System Architecture Evolution with Packet Data Network Gateway and Serving Gateway (vSAEGW), a virtual Home Subscriber Server (vHSS), a virtual Diameter Routing Agent (vDRA), virtual firewall (vFW), virtual router (v-Router), et cetera, and other virtualized functions supporting wireless networks.

For example, a vMME can be defined in terms of MME functions or subcomponents, each of which is supported alone or in combination by one or more VMs 104. VMs 104 can be dedicated or shared VMs actively engaged or available in standby. VMs 104 are supported by resources 108 of hardware platform 106 and/or other hardware platform. CPU time from resources 108 is allocated to VMs 104 for the vMME.

While certain aspects herein describe VMs and VNFs providing virtualization for mobility networks, the aspects herein are similarly relevant to other virtualized applications and environments. Examples can include, but are not limited to, content streaming, processing-intensive engineering modeling, infrastructure as a service or platform as a service, Internet-of-Things or big data analytics, software testing, backup and disaster recovery, et cetera.

Figure 1C:
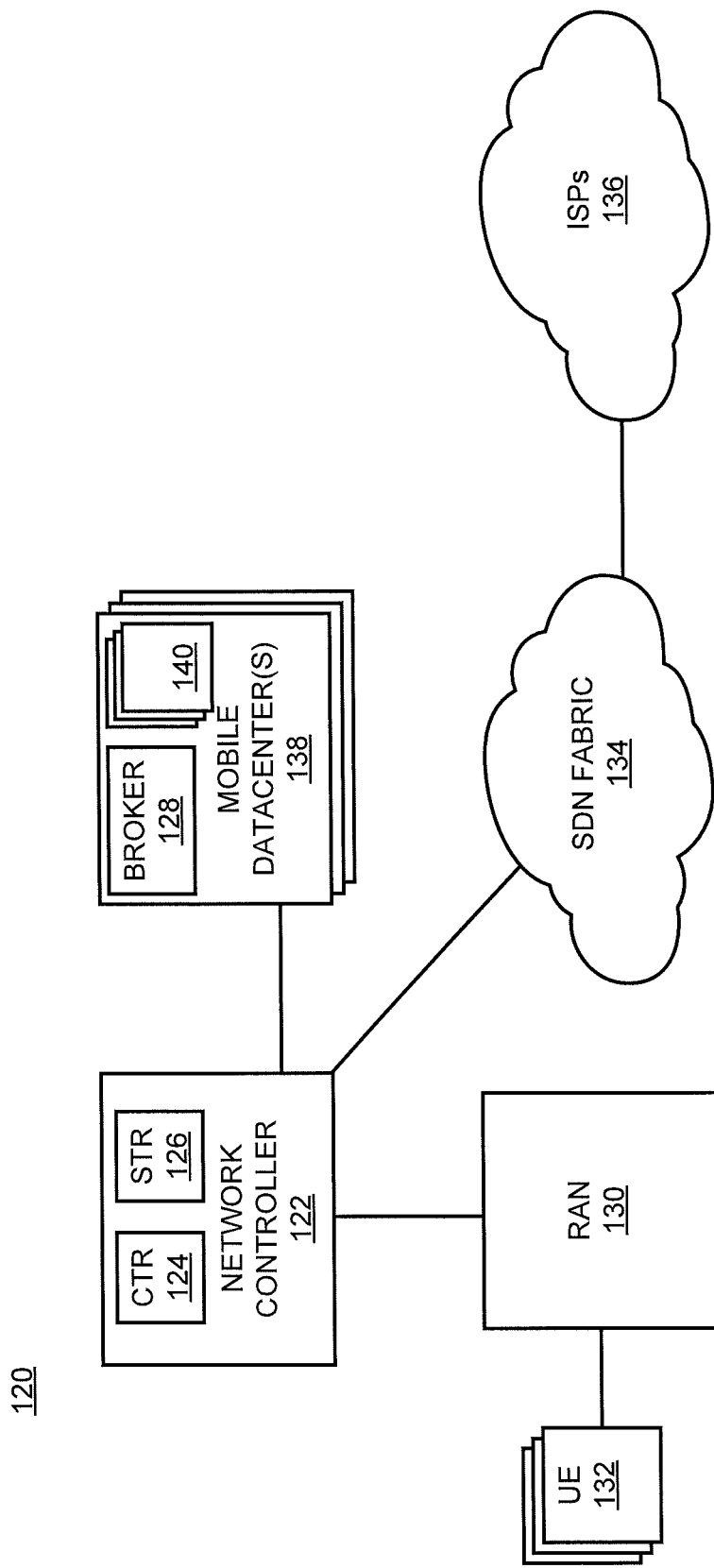
FIG. 1C is a representation of an example system for implementing a per-UE container architecture.

FIG. 1C illustrates an example system 120 for implementing automated modification of virtualized functions as supported by environments like those of FIGS. 1A and 1B. System 120 includes container app 124, steering app 126, network controller 122, broker 128, and SDN fabric 134. System 120 can also include RAN 130, which facilitates access with UE(s) 132, and internet service providers (ISPs) 136 that facilitate access to the internet or various alternative networks.

RAN 130 can be a traditional radio access network. The proposed solution including per-UE containers is compatible with current RANs because it does not modify the radio protocols (e.g., LTE) between RANs (e.g., RAN 130) and UE (e.g., UE 132).

SDN fabric 134 is a flat switching fabric of SDN switches, different from the hierarchical structure of EPC, to interconnect eNBs and mini-datacenters (mDCs) 138. System 120 can accordingly set up and direct low-latency paths between two or more local UE 132. The interconnected mDCs 138 are distributed in the vicinity of a given UE (e.g., among UE 132). The architecture of SDN fabric 134 provides a greater number of egress points than EPC architecture, with egress points particularly located close to the RAN, to reduce path inflation experienced in EPC architecture.

Latency will be dependent on distance between UE 132 and mDCs 138. The number, capacity, and location of mDCs 138 will depend on factors (e.g., latency requirement, radio coverage). mDCs 138 run per-UE containers (e.g., per-UE container 140 as in FIG. 1D). mDCs 138 can run the containers (and other processes, containers, applications, modules, components, et cetera) on commodity servers in embodiments.

The disclosed architecture does include a centralized control plane, provided by network controller 122. Network controller 122 provides mechanisms for managing containers (e.g., container module 124), programming switches (e.g., steering module 126), and configuring eNBs. Unlike other SDN architectures that centralize all control NFs on the controller, network controller 122 offloads local NFs onto UE containers 140 close to RAN 130.

In embodiments, eNBs (of, e.g., RAN 130) forward requests relating to UE 132 (e.g., when they are turned on and seek to enter a network) to network controller 122. Container module 124 can fetch a UE profile (e.g., plan, type, SIM card key or other information) from a subscriber database. Container module 124 can, based on the profile, instantiate a customized (and, in embodiments, optimized) container for UE 132 in a particular mDC 138 in proximity to UE 132. Instantiation can occur as UE 132 seeks to associate with a network (e.g., when UE 132 is powered on). Steering module 126 programs the SDN fabric 134 to direct signaling and data traffic associated with a particular UE 132 to an associated per-UE container 140 for policy enforcement.

Because there will be millions of per-UE containers 140 in a network, network controller 122 communicates with per-UE containers 140 based on a publish-subscribe model or technique. Broker 128 (or multiple brokers) is associated with each mDC 138 to facilitate subscription (e.g., by network controller 122) to one or more container events (e.g., low Quality of Experience (QoE)), or categories or classes of container events (e.g., QoE). In alternative embodiments, broker 128 can be associated with multiple MDCs 138, and various brokers can interoperate with various MDCs (and/or MDCs may switch between brokers or brokers may switch between MDCs) without departing from the scope or spirit of the innovation. Either on its own initiative or based on receipt of published information, network controller 122 can reconfigure one or more per-UE containers 140 to correspond to network conditions (e.g., adding or changing policies) in real-time or during runtime. To aid scalability and performance, per-UE containers 140 are also configured to manage local network events (e.g., triggered by traffic associated with UE 132) without involving controller 122.

When a particular UE 132 no longer needs an associated per-UE container 140 (e.g., particular UE 132 powering off), network controller 122 is notified by the associated container 140. Network controller 122 thereafter fetches states associated with the particular UE 132 from the associated per-UE container 140, persists the states, and then destroys per-UE container 140. Persistence of states associated with particular UE 132 facilitates quick-recovery if a running per-UE container 140 crashes or fails, or if a particular UE 132 is improperly shut down or unintentionally dropped.

When a particular UE 132 changes its location, the proximity of an associated per-UE container 140 may decrease (e.g., farther distance and increased latency). Where a closer mDC 138 among the mDCs 138 is available to the particular UE 132, an associated per-UE container 140 can be migrated to the closer, proximate mDC 138.

UE 132 can include various UE including, but not limited to, mobile devices, autonomous vehicles, et cetera. ISPs 136 can include one or more internet service providers or other network access providers, accessed at least in part via SDN fabric 134.

Connections between elements of system 120 can use varying communication links. For example, traditional network links, OpenFlow, or custom links can be utilized without departing from the scope or spirit of the innovation.

Figure 1D:
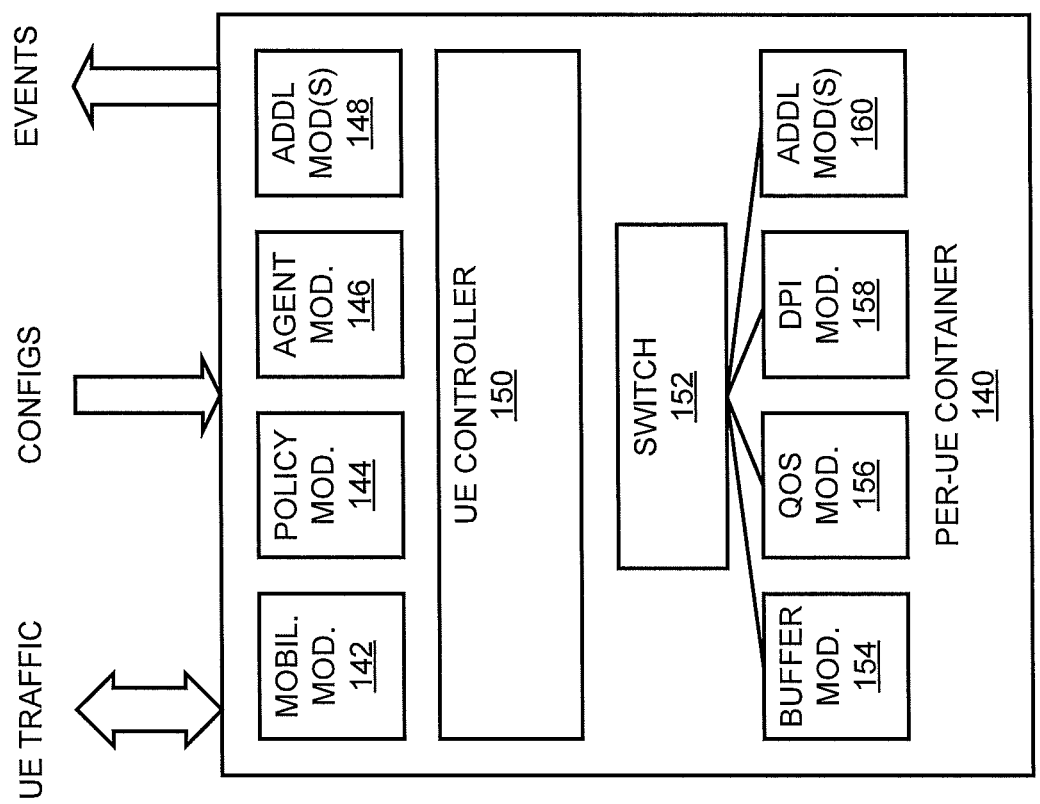
FIG. 1D is a representation of an example system for implementing a per-UE container architecture.

FIG. 1D illustrates an example per-UE container 140 described herein. Per-UE container 140 transmits and receives UE traffic, while also at least receiving configuration information and at least sending event information. Per-UE container 140 embeds a bundle of customized (and, in embodiments, optimized) data functions to process data traffic (e.g., to or from one or more associated UE 132) and control functions to process signaling traffic (e.g., related to one or more associated UE 132).

Per-UE container 140 includes a mobility app 142, policy app 144, and agent app 146, and may include additional app(s) 148. Per-UE container 140 can also include a UE controller 150. Per-UE container 140 can also include switch 152, which can be operatively coupled with or include, e.g., buffer module 154, QoS module 156, DPI module 158, and may include additional module(s) 160. Control plane functions (e.g., LTE security, mobility, policy management) process each UE 132 signaling traffic independent of different UE 132 signaling traffic, so they can be implemented in per-UE container 140.

UE controller 150 provides logic to act as a container module and run control modules including: mobility module 142, which performs handover, paging, and authentication operations by processing UE 132 signaling traffic and issuing commands to UE 132 through eNBs (e.g., of RAN 130); policy module 144, which enforces data plane policies (e.g., QoS, monitoring, security) on UE 132 by forwarding associated data traffic through additional modules 148 (e.g., data NFs) of per-UE container 140; and agent module 146, which asynchronously communicates with network controller 122 based on the publish-subscribe model. Network controller 122 can include an agent monitor to participate in the publish-subscribe arrangement. In embodiments, UE controller 150 runs additional modules (which can be signaling NFs or data NFs).

More specifically, among data plane NFs, LTE accounting, NAT, firewall, buffers, video optimizer, deep packet inspection (DPI), noise canceling and many monitoring NFs can be ported to per-UE containers 140 without substantial modification. While certain NFs may still process traffic from multiple UE 132 (e.g., caching, prefetching), such NFs can still be designed to run in a distributed mode in containers by enabling the containers to share information using distributed hash table (DHT) services. As shown, per-UE container 140 includes buffer module 154, QoS module 156, DPI module 158, and additional modules 160 (including but not limited to further data NFs).

Certain NFs might benefit from processing multiple UE 132 traffic (e.g., caching, prefetching). Even these NFs can be designed to efficiently run in a distributed mode in containers by enabling the containers to share information using existing DHT (distributed hash table) services. Some data NFs may still be implemented in edge switches (e.g., firewall, NAT) to quickly process certain traffic (e.g., unwanted traffic) at different network locations while custom versions specific providing similar, supplemental, and/or customized functionality run in per-UE containers 140. For modularity, the disclosed solution can isolate each data NF in each per-UE container 140 into a network namespace and interconnect them using a software switch.

One or more modules (or all modules) of per-UE container 140 can be communicatively coupled with switch 152 for receiving, processing, and forwarding traffic to and from per-UE container 140.

Per-UE container 140 enables systems or operators to select and solve particular parameters (including, but not limited to, optimizing) for different sets of control and data NFs for the particular per-UE container 140 (with other control and data NFs, or parameters, with a different per-UE container). This obviates the need for certain tunneling procedures used to chain distributed NFs, reducing forwarding states in data plane switches. Scalability is also improved by reducing the number of per-UE states on a central controller (which may be reduced at least by a number of states managed by per-UE container 140). By centralizing the core NFs for each UE in per-UE container, the architecture produces and consumes network states associated with each UE within the boundaries of containers (local processes) on servers. This reduces or eliminates the need for distributed protocols among distant devices, correspondingly reducing the east-west signaling overheads in the core.

By arranging per-UE container 140 in proximity to associated UE (e.g., one of UE 132), faster latency (e.g., less than one millisecond) can be achieved by avoiding propagation delays in the core network. Core I/O costs are reduced, and individual UE (e.g., among UE 132) can be independently migrated to maintain proximity as the UE travels. Control-plane synchronization delays can also be reduced or eliminated by consolidating control and data NFs.

Per-UE container 140 and associated architecture are economically viable for the growing Internet-of-Things (IoT) ecosystem potentially including hundreds of millions of UE because: per-UE container 140 has little to no overheads or startup delays; per-UE container 140 and other per-UE containers, and in embodiments associated architecture, can run on commodity servers (which are less expensive and potentially offer more resources than proprietary hardware appliances); and overhead for running and duplicating the same or similar base function modules in per-UE container 140 and other per-UE containers is insignificant compared to the overall packet processing cost in the network.

Figure 1E:
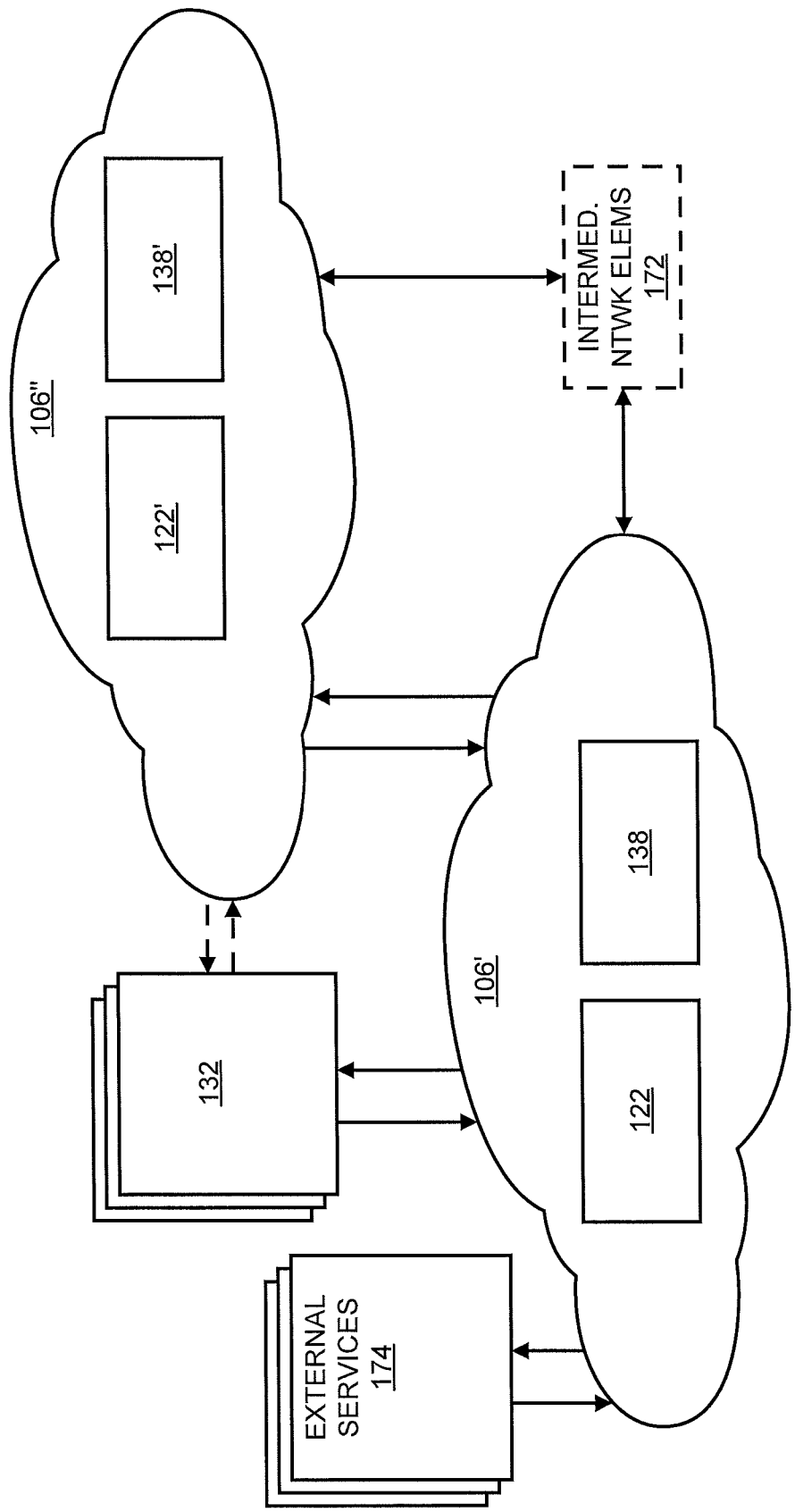
FIG. 1E is a representation of an example per-UE architecture implemented in the example network and/or example hardware platform of FIGS. 1A and 1B.

FIG. 1E illustrates an example implementation of a system 170 showing the aspects illustrated in FIGS. 1C and 1D as implemented in the environment illustrated in FIGS. 1A and 1B. System 170 includes cloud 106', which hosts a variety of virtualized nodes using hardware platform 106. While certain elements of system 170 are shown separately from cloud 106', it is understood that various other hardware can be utilized in conjunction with system 170 without departing from the scope or spirit of the innovation. More, such elements may be a portion of hardware platform 106, or may be located among other hardware. Further, cloud 106' can include resources (and therefore host virtualized nodes) in and from two or more data centers and other disparate resources. Cloud 106" can be similarly (or identically) flexible or different from the illustrated embodiment.

System 170 hosts one or more network controllers 122 and one or more mDCs 138. Cloud 106' can interact with various entities outside cloud 106', such as, e.g., UE 132 and/or external services 174. Cloud 106' can interact with other clouds, such as cloud 106", which are supported by distinct hardware resources in the same or different datacenters. Depending on the arrangement, cloud 106' and cloud 106" (or elements hosted thereby) may communicate directly or via various intermediate network elements 172 (e.g., gateways, switches, routers, others). In embodiments intermediate network elements 172 can also be arranged (logically and/or physically) between cloud 106' (or cloud 106") and UE 132 and/or external services 174. Cloud 106", like cloud 106', can include one or more network controllers 122' and/or one or more mDCs 138'. UE 132 can have one or more associated per-UE containers hosted by mDC 138, but as UE 132 move(s) to be in closer proximity to resources of cloud 106" the one or more associated per-UE containers can be migrated to mDC 138'.

Figure 2:
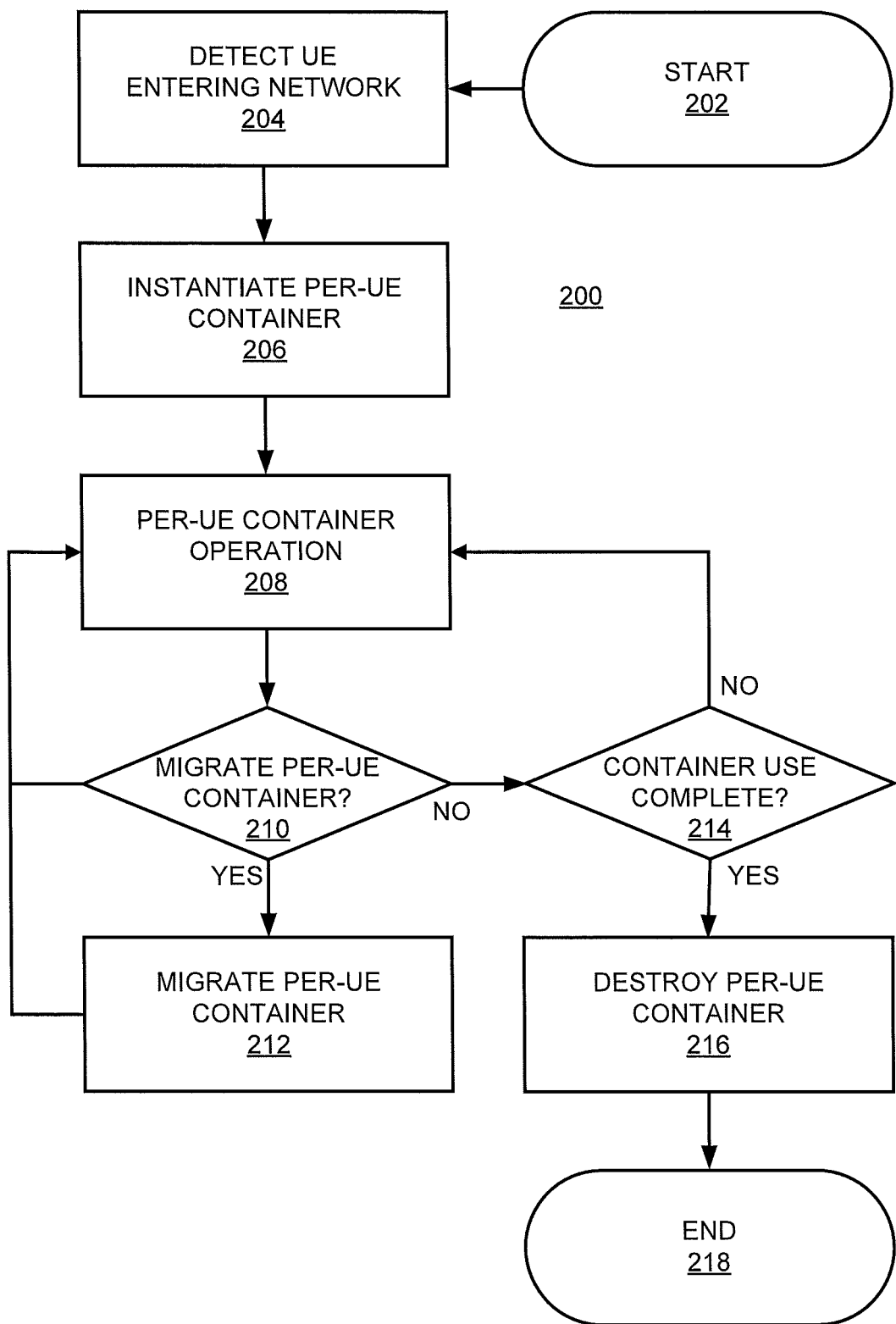
FIG. 2 is a method that may be used to implement a per-UE container architecture.

FIG. 2 illustrates a methodology 200 for managing per-UE containers. Methodology 200 begins at 202 and proceeds to 204 where UE entering a network is detected. Alternatively or complementarily, UE may be identified in another manner, such as identifying UE already in a network having no per-UE containers instantiated. Detecting or identifying the UE can include identifying a UE profile associated with the UE (e.g., in a Home Subscriber Server) in response to an edge node (e.g., an eNodeB, any node in a RAN, a router, a cell or micro-cell) detecting or receiving a communication (e.g., access request) from a device (e.g., after it is powered on, after it attempts to associate with a new network, after it comes out of an "airplane" mode, et cetera).

At 206, a per-UE container is instantiated for the identified UE. This can include instantiating, using a container module and based on a fetched UE profile associated with the UE. The per-user equipment container represents the UE. The container comprises a mobility module of the per-UE container configured to manage mobility of the UE in the network, and a policy module of the per-UE container configured to manage data plane policies associated with the UE.

At 208, the per-UE container is used or persists during use of other services associated with the UE. At some point during operation, either based on a continuous or periodic check, physical movement of the UE, logical movement of the UE, or other conditions, a determination at 210 can be made as to whether the UE container should be migrated. Migration of the UE container can be performed to support the UE container with physical resources that are geographically closer to the UE, thereby decreasing latency between the UE container and the UE by minimizing propagation time, intervening nodes, and other causes of inflated paths or communication delays. Migration of the UE container may also be performed to support the UE container with resources logically closer to the UE based on system architecture and logical components fixed within the system architecture. In embodiments, the determination at 210 can be based on a physical distance, a latency, or a difference in latency (or threshold of minimum latency difference to trigger migration) between UE and two or more mDCs.

If the determination at 210 returns positive, at 212 the per-UE container is migrated to the identified Mdc. Thereafter, methodology 200 can return to 208 where operation continues.

If the determination at 210 returns negative, methodology 200 proceeds to 214 where a determination is made as to whether use of the per-UE container is complete (e.g., associated UE turning off). If not, methodology 200 returns to 208 where operation continues.

If the determination at 214 returns positive, methodology 200 can proceed to 216 where the per-UE container is destroyed. Thereafter, at 218, methodology 200 can end.

In further aspects of methodology 200 or similar methodologies, a step can include directing another (or second, third, et cetera) UE data traffic for another (or second, third, et cetera) UE to another (or second, third, et cetera) policy module of another (or second, third, et cetera) per-UE container not instantiated by the container module. In further aspects of methodology 200 or similar methodologies, steps can include instantiating a broker associated with the per-UE container, wherein the container module communicates with the per-UE container via the broker.

By using the techniques described in methodology 200 or elsewhere herein, large-scale, customized, low-latency services can be provisioned at low cost on a per-UE basis. Selection and parameter solving for different sets of control and data NFs for UE containers based on UE capabilities and needs can improve UE performance (e.g., battery life, QoE) without degrading network performance or increasing the complexity of UE services. Flexible migration of containers provides consistent latency management, and consolidation of NFs for each UE in a container reduces core signaling overheads. Introduction of new services can be completed more rapidly because service failure impact is limited to sets of customers actually using the service rather than an entire population of users. This can simplify testing procedures and speed up service introduction while reducing costs, and permits true continuous integration/continuous delivery methodology. Further, mobile edge computing (MEC) can be flexibly realized with a a high-resolution, customizable, large-scale implementation (e.g., deploying an edge compute micro-service on a per-UE basis). This architecture allows for a greater number of UE to be supported on a network with fixed resources (e.g., 1.25 million or more UE per CPU core) than are supported in EPC systems (e.g., per-UE container architecture facilitates 6.2-8.3 times more UE per CPU core). This is achieved in part due to a reduction in signaling overheads (e.g., 86% fewer signaling overheads in per-UE container architecture versus EPC systems) and round trip times (RTTs) (which can be, e.g., 50% lower for device-to-device traffic in a per-UE container architecture versus EPC systems).

Per-UE architectures allow services to be designed around UE needs and capabilities (e.g., hardware, battery, service plan). Customized or specialized control functions can manage UE signaling traffic while customized or specialized data functions enforce policies on its data traffic. This type of massive customization would overwhelm or be prohibitively expensive on EPC systems. Further, future network use cases (e.g., high-speed mobility, device-to-device communication) will need to manage control and data plane latencies in the network core (e.g., sub-one millisecond. EPC system latencies (of, e.g., 10-30 milliseconds in the data plane and 10-60 milliseconds in the control plane) are comparatively slow due to centralized core infrastructure at the internet edge far from UE, diversity of latency requirements for UE, and UE mobility. Per-UE architectures avoid signaling storms by reducing control information exchange and interdependence between core elements.

Figure 3:
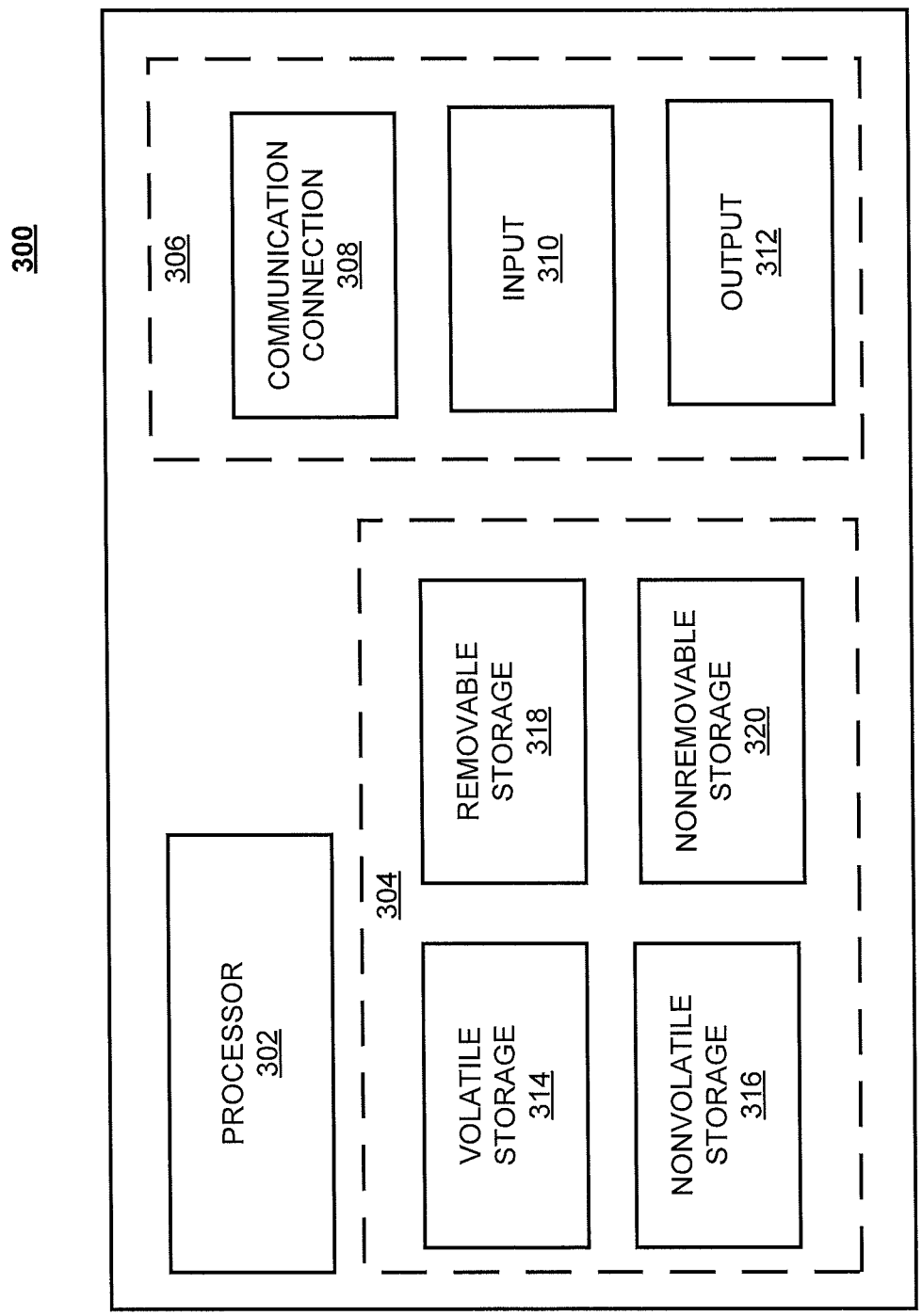
FIG. 3 is a schematic of an example device that may be a component of the system of FIG. 1B.

Turning to FIG. 3, illustrated is a block diagram of network device 300 that may be connected to or comprise a component of network 100. For example, network device 300 may implement one or more portions of methodology 200 for placement of network components of application 102. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is example and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications there between. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
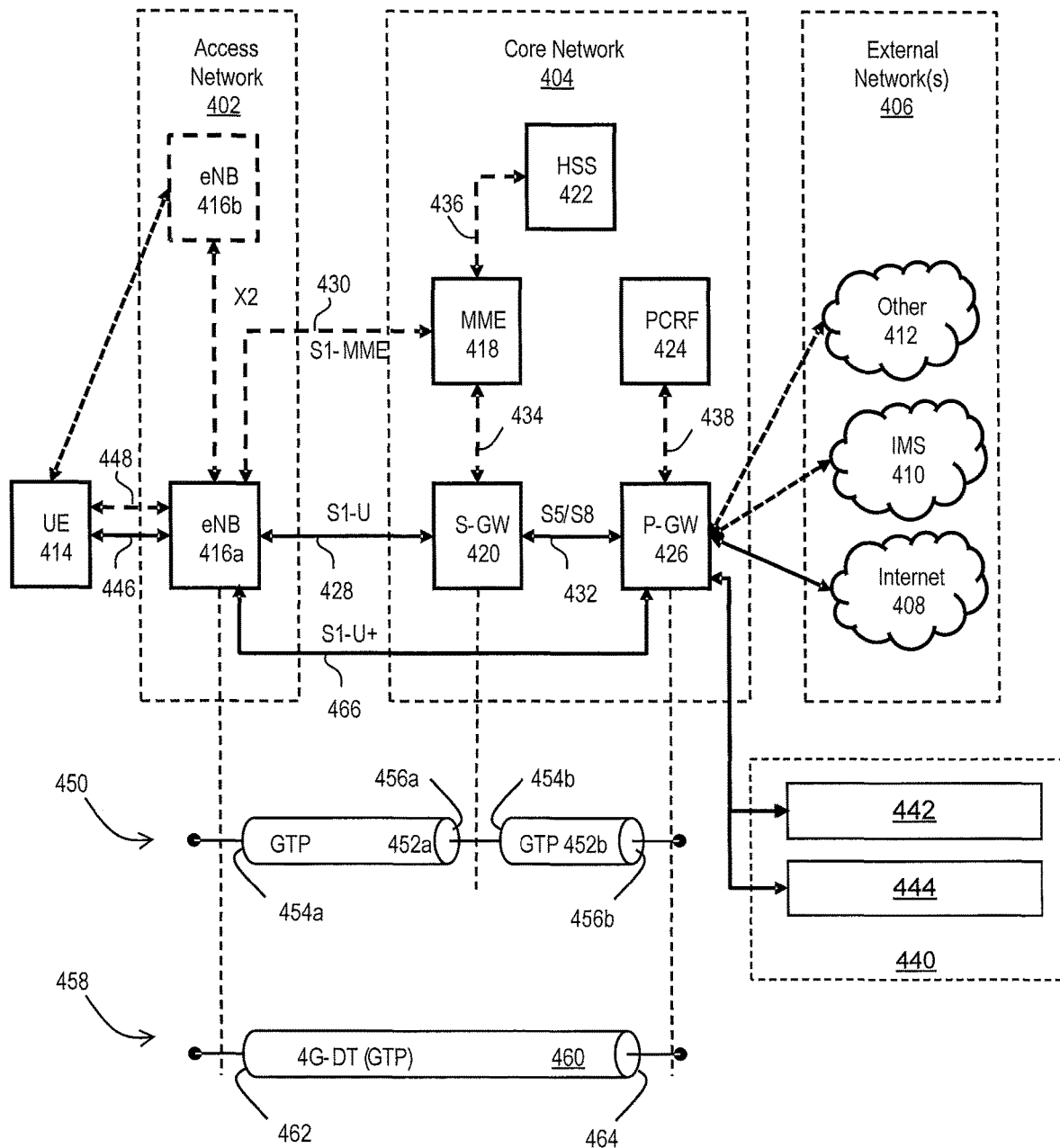
FIG. 4 depicts an example communication system that provide wireless telecommunication services over wireless communication networks upon which an application may be deployed using the disclosed systems or methods.

FIG. 4 illustrates a functional block diagram depicting one example of an LTE-EPS network architecture 400 that may be at least partially implemented as using virtualized functions. Network architecture 400 disclosed herein is referred to as a modified LTE-EPS architecture 400 to distinguish it from a traditional LTE-EPS architecture.

While aspects of FIG. 4 and accompanying of network architecture 400 are discussed in relation to LTE, it is expressly noted that aspects herein can be alternatively or complementarily implemented in 5G (or other) network architectures without departing from the scope or spirit of the innovation.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service requirements for the user, et cetera. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
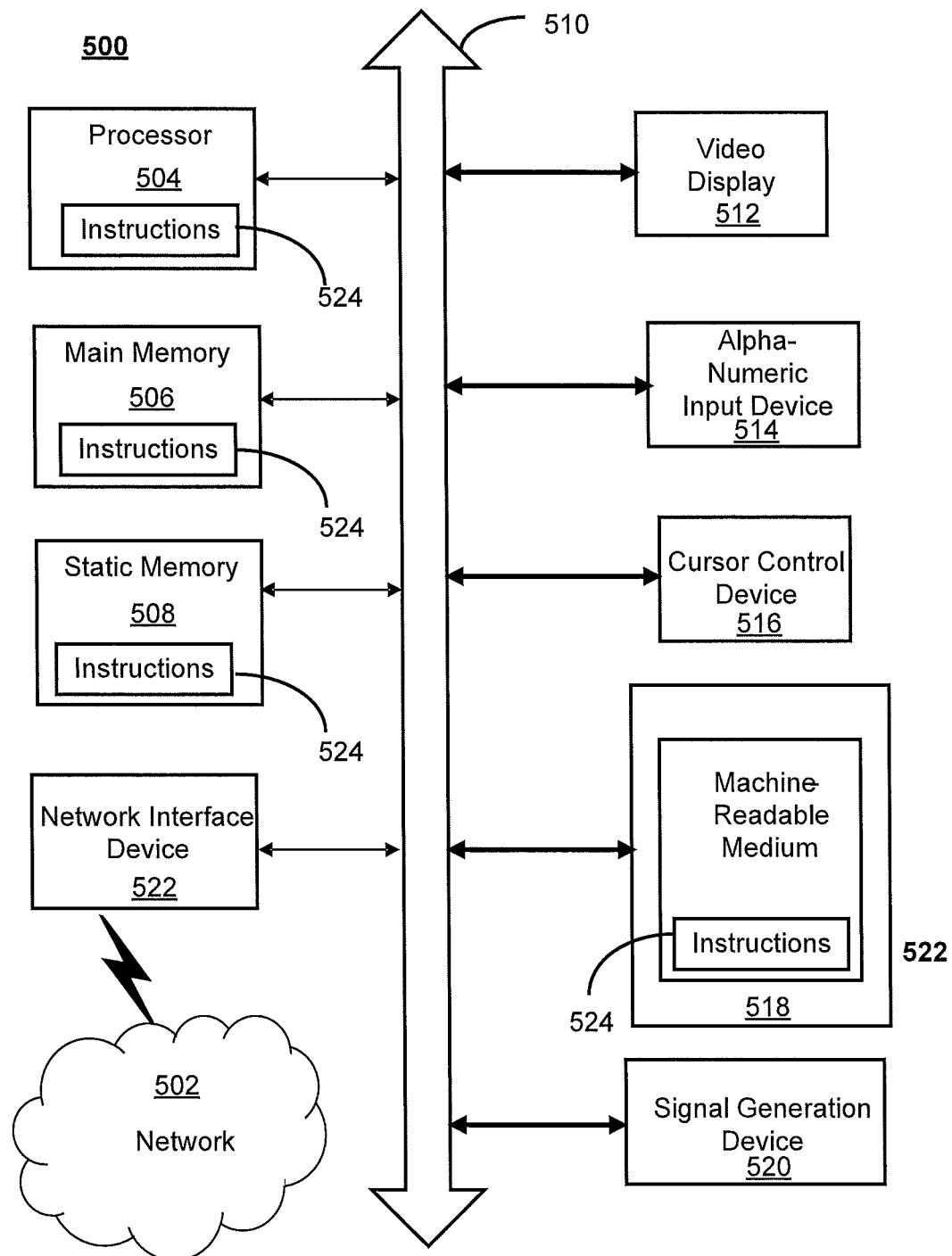
FIG. 5 depicts an example communication system that provide wireless telecommunication services over wireless communication networks that may be modeled using the disclosed systems and methods for configuring a virtualized network platform.

FIG. 5 depicts an example diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
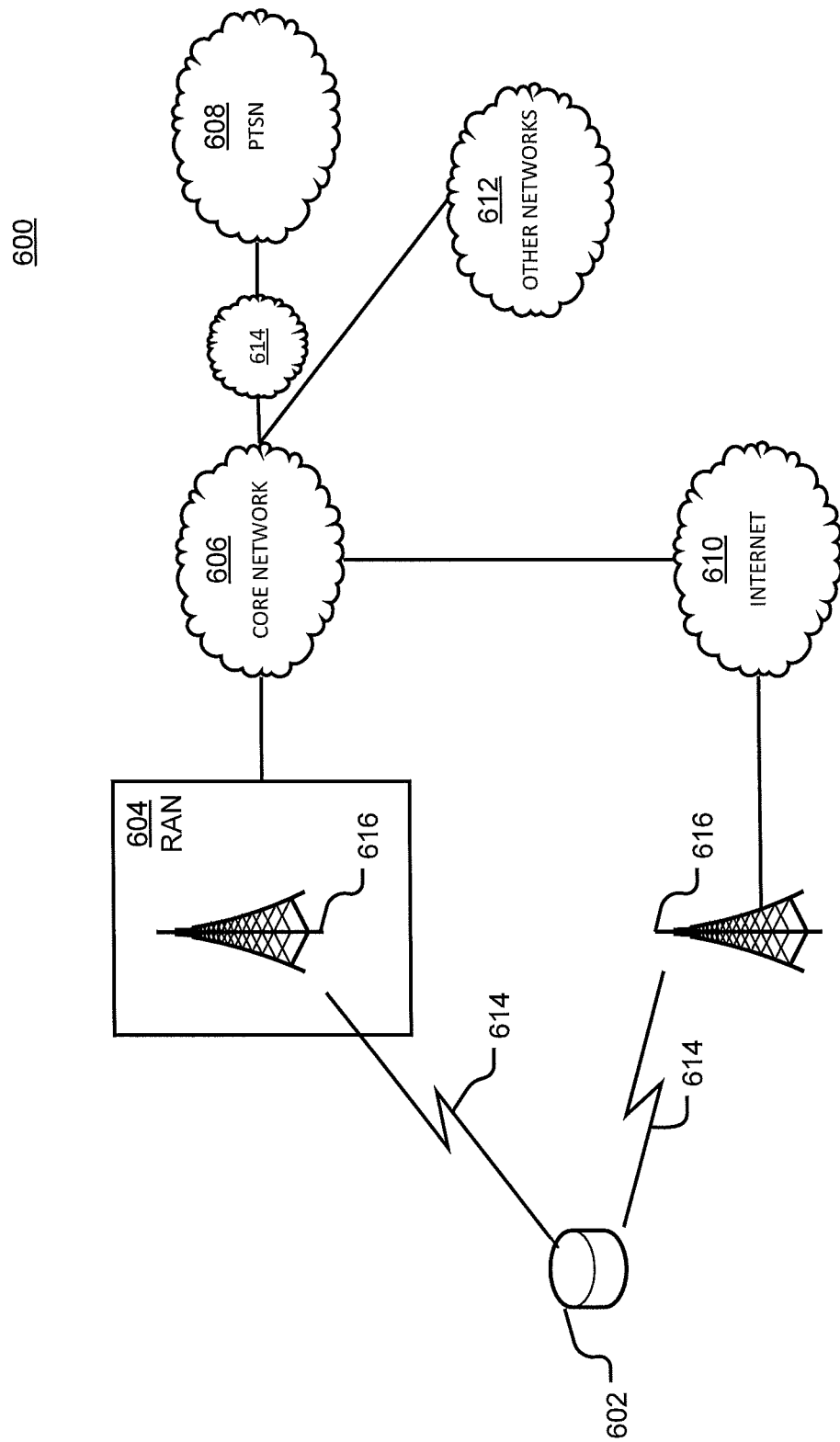
FIG. 6 is a diagram of an example telecommunications system in which the disclosed systems or methods may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614. As with other portions of this disclosure, while aspects relating to FIG. 6 are at times described in relation to LTE architectures, 5G architectures (and others) may be incorporated or utilized without departing from the scope or spirit of the innovation.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, et cetera) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
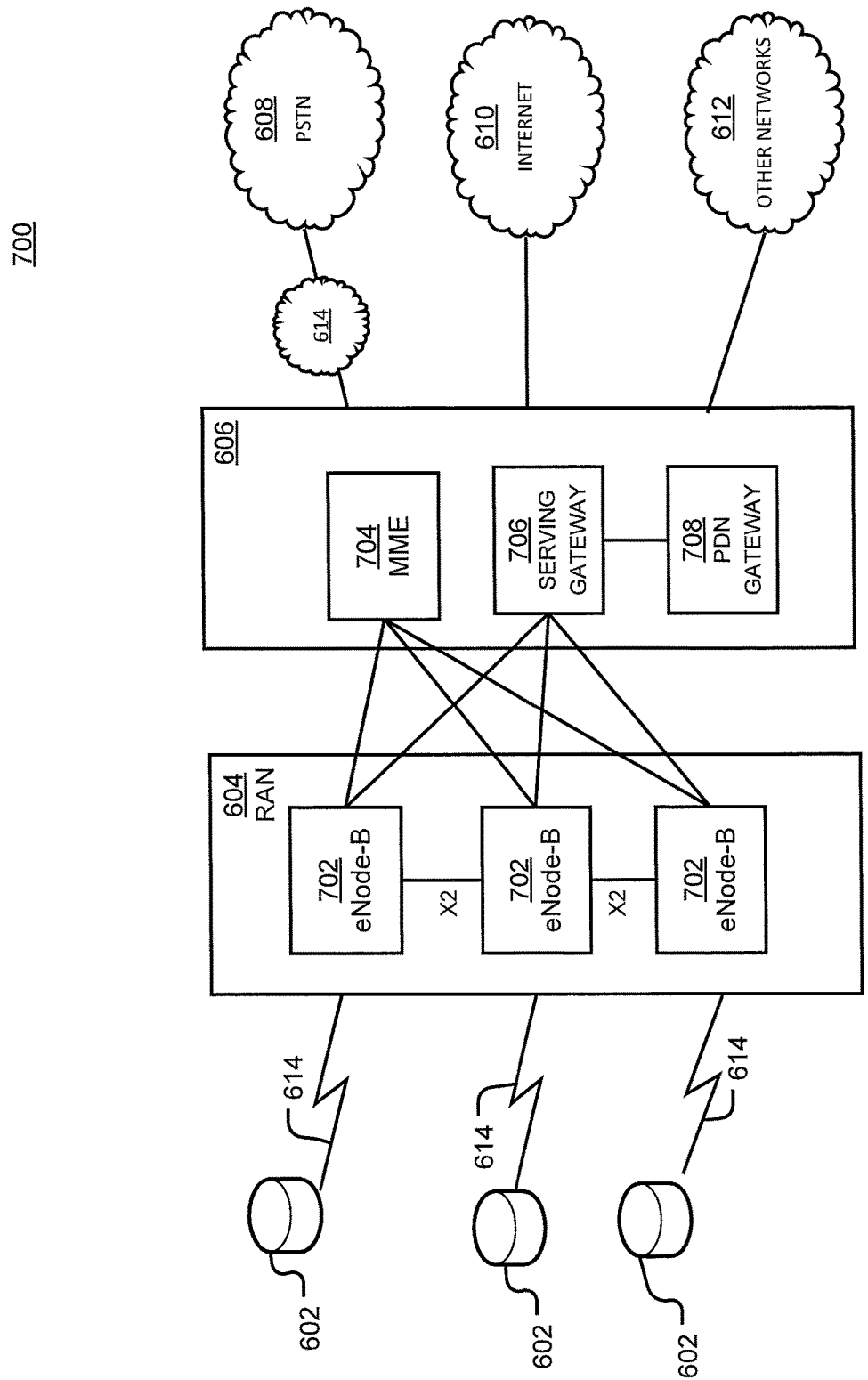
FIG. 7 is an example system diagram of a radio access network and a core network upon which an application may be deployed using the disclosed systems or methods.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

The methods and systems associated with per-UE containers and related aspects as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing content delivery as described herein. When implemented on a general-purpose processor, the program code combines with the processor to provide a unique device that operates to invoke the functionality of a streaming system.

While per-UE container systems and methods and related aspects have been described in connection with the various examples of the various figures, it is to be understood that other similar implementations may be used or modifications and additions may be made to the described examples of a system or method without deviating therefrom. Systems and methods as described herein should not be limited to any single example, but rather should be construed in breadth and scope in accordance with the appended claims and other disclosed embodiments.

What is claimed is:

1. A system, comprising:
   one or more processors; and
   memory coupled with the one or more processors, the memory storing executable instructions that when executed by the one or more processors cause the one or more processors to effectuate operations comprising:
      detecting a user equipment (UE) entering a network;
      fetching a UE profile associated with the UE;
      instantiating, based on the UE profile associated with the UE, a per-user equipment (per-UE) container representing the UE, the per-UE container in proximity to a radio network edge connected with the UE, wherein the per-UE container includes core network functions for the UE, wherein the core network functions comprise a mobility management entity (MME) function, home subscriber server (HSS) function, or policy and charging rule function (PCRF); and
      steering subsequent signaling traffic and data traffic through the per-UE container.

2. The system of claim 1, further comprising:
   a network controller configured to direct traffic for the UE to the per-UE container.

3. The system of claim 2, further comprising:
   a broker associated with the per-UE container, wherein the network controller communicates with the per-UE container via the broker.

4. The system of claim 2, further comprising:
   a broker associated with another per-UE container not instantiated by the container module, wherein the network controller communicates with the other per-UE container via the broker.

5. The system of claim 2, wherein the per-UE container communicates with the network controller using a publish-subscribe technique.

6. The system of claim 5, the operations further comprising:
   subscribing to messages published by the per-UE container.

7. The system of claim 1, the operations further comprising destroying the per-UE container based on removal of the UE from the network.

8. The system of claim 1, wherein the location is dynamic.

9. The system of claim 1, wherein the data traffic is tunneled through a plurality of virtual switches.

10. The system of claim 1, further comprising a SDN fabric.

11. A method, comprising:
    detecting user equipment (UE) entering a network;
    fetching a UE profile associated with the UE;
    instantiating, using a container module and based on the UE profile associated with the UE, a per-user equipment (per-UE) container representing the UE, the per-UE container in proximity to a radio network edge connected with the UE, wherein the per-UE container includes core network functions for the UE, wherein the core network functions comprise a mobility management entity (MME) function, home subscriber server (HSS) function, or policy and charging rule function (PCRF); and
    steering subsequent signaling traffic and data traffic through the per-UE container.

12. The method of claim 11, further comprising:
    directing another UE data traffic for another UE to another policy module of another per-UE container not instantiated by the container module.

13. The method of claim 11, further comprising:
    determining the UE is dissociating from the network; and
    destroying, using the container module, the per-UE container in response to determining the UE is dissociating from the network.

14. The method of claim 11, further comprising:
    instantiating a broker associated with the per-UE container, wherein the container module communicates with the per-UE container via the broker.

15. The method of claim 11, wherein the container module communicates with the per-UE container using a publish-subscribe technique.

16. A computer readable storage medium that is not a signal storing computer executable instructions that when executed by a computing device cause said computing device to effectuate operations comprising:
    detecting a user equipment (UE) entering a network;
    fetching a UE profile associated with the UE;
    instantiating, based on the UE profile associated with the UE, a per-user equipment (per-UE) container representing the UE, the per-UE container in proximity to a radio network edge connected with the UE, wherein the per-UE container includes core network functions for the UE, wherein the core network functions comprise a mobility management entity (MME) function, home subscriber server (HSS) function, or policy and charging rule function (PCRF); and
    steering subsequent signaling traffic and data traffic through the per-UE container.

17. The computer readable storage medium 16, the operations further comprising subscribing to messages published by the per-UE container.

18. The computer readable storage medium 16, the operations further comprising destroying the per-UE container based on removal of the UE from the network.

19. The computer readable storage medium 16, wherein the data traffic is tunneled through a plurality of virtual switches.

\* \* \* \* \*